United States Patent [19]
Holt

[11] 3,924,163
[45] Dec. 2, 1975

[54] DIRECTION INDICATOR CONTROL CIRCUIT

[75] Inventor: William David Holt, Colne, England

[73] Assignee: Lucas Electrical Co. Ltd., Birmingham, England

[22] Filed: Mar. 11, 1974

[21] Appl. No.: 450,005

[30] Foreign Application Priority Data
Mar. 22, 1973 United Kingdom............ 13785/73

[52] U.S. Cl................ 317/148.5 R; 315/81; 340/55
[51] Int. Cl.².......................................... B60Q 1/42
[58] Field of Search .. 340/55, 81 R; 315/81, 200 A; 317/148.5 R, 123, 137; 307/10 R, 10 LS

[56] References Cited
UNITED STATES PATENTS

| | | | |
|---|---|---|---|
| 3,396,367 | 8/1968 | Lohse | 340/55 |
| 3,555,506 | 1/1971 | Daws | 340/81 R |
| 3,588,812 | 6/1971 | Wheelock et al. | 340/55 |

*Primary Examiner*—L. T. Hix
*Attorney, Agent, or Firm*—Gaylord P. Haas, Jr.

[57] ABSTRACT

A direction indicator control circuit for a road vehicle has first and second relays and manually operable switch means for energising one or other of the relays. The relays once energised are de-energised by semiconductor switching means sensitive to turning of the steering wheel of the vehicle.

5 Claims, 1 Drawing Figure

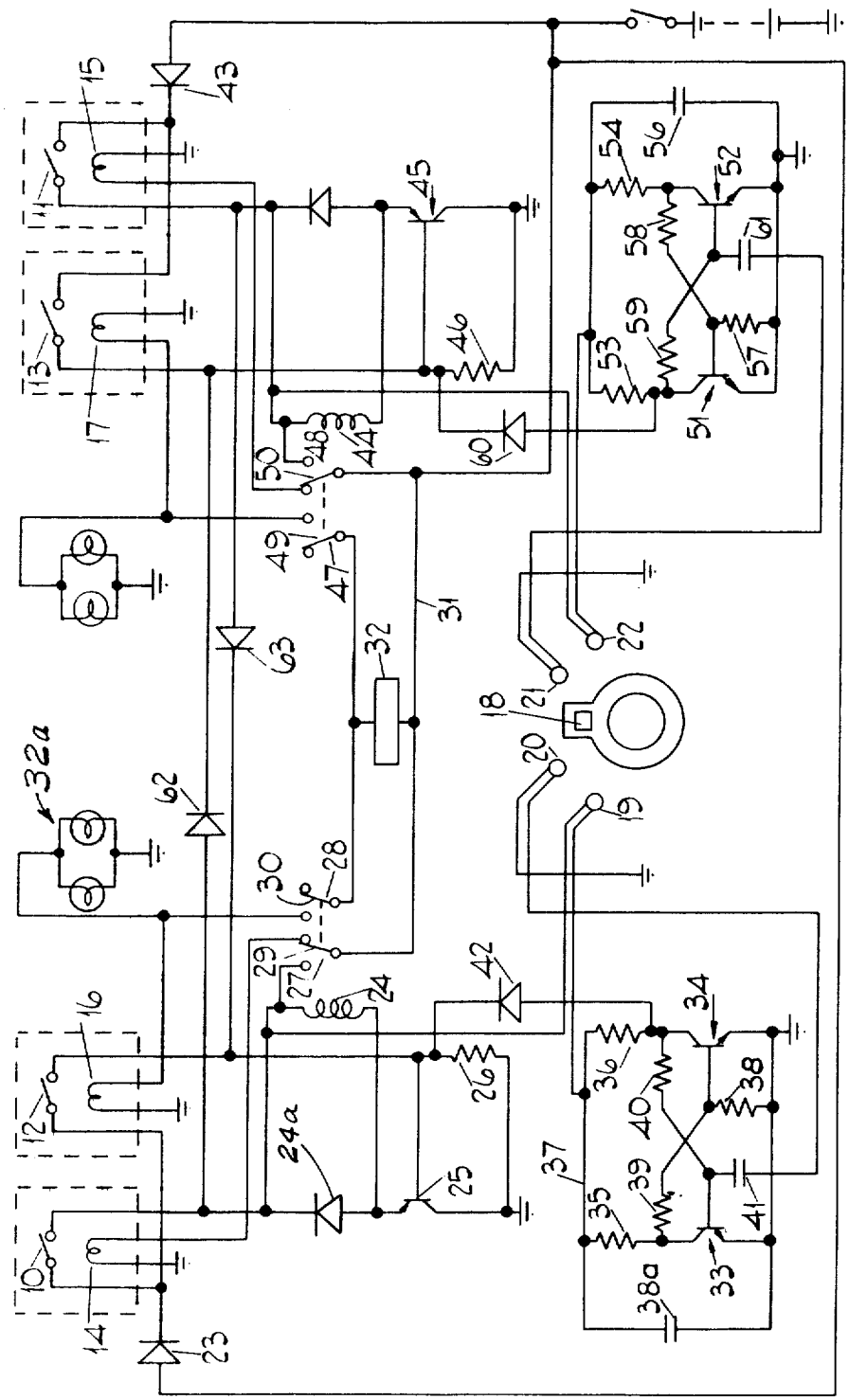

DIRECTION INDICATOR CONTROL CIRCUIT

This invention relates to a direction indicator control circuit for use in a road vehicle, and has as its object the provision of such a control circuit in a convenient form.

This invention resides in a direction indicator control circuit for use in road vehicles comprising first and second relays, manually operable switch means associated with each relay for causing energisation of the coil of the associated relay, first semi-conductor switching means for de-energising said first relay in response to movement of the vehicle steering mechanism in one angular direction towards its central position and second semi-conductor switching means for de-energising said second relay in response to movement of the vehicle steering mechanism in the opposite angular direction towards said central position.

Preferably, a transducer is provided, said transducer comprising a first part mountable on a moving part of the steering mechanism, and second and third parts which are associated with the first and second semi-conductor switching means respectively and which co-operate with said first part to in use cause the associated semi-conductor switching means to de-energise the associated relay coil.

Desirably, first and second additional manually operable switch means are provided for permitting manual de-energisation of the first and second relay coils respectively.

Conveniently, electrical circuit means are provided for de-energising an energised relay coil if the manually operable switch means associated with the other relay coil is operated.

The invention will now be more particularly described with reference to the accompanying drawing which is a circuit diagram illustrating one embodiment of a direction indicator control circuit for use in a road vehicle and constructed in accordance with the present invention.

Referring now more particularly to the drawing, the direction indicator control circuit comprises a first manually operable switch in the form of a normally open contact switch 10 which is closable to energise the left hand direction indicator lamps of a road vehicle upon which the control circuit is mounted, and a second manually operable switch in the form of a normally open contact switch 11 which when closed energises the right hand direction indicator lamps on the road vehicle. There is also provided first and second additional manually operable switches in the form of normally open contact switches 12 and 13 which when closed de-energise the left hand and right hand direction indicator lamps respectively if the associated lamps are energised at the time of closure of the associated additional contact switch. Each switch 10 to 13 has an associated lamp 14 to 17 respectively for illuminating the contact button of the associated switch in a manner to be described hereinafter.

Embedded in the angularly movable part of the road vehicle steering column (or in any other movable part of the road vehicle steering mechanism) is a permanent magnet 18 which forms a part of a transducer, the latter also comprising four reed switches 19, 20, 21 and 22. The reed switches 19 and 20 are angularly spaced with respect to the steering column of the road vehicle so that as this column is turned in an anti-clockwise direction from its central position, the permanent magnet 18 will first cause closure of the reed switch 20 followed by closure of the reed switch 19. Moreover, the reed switches 21 and 22 are angularly spaced with respect to the steering column such that during angular movement of the latter in a clockwise direction from its central position will cause first of all the reed switch 21 to close followed by the reed switch 22. The positive side of the vehicle ignition is connected to the anode of a diode 23, the cathode of which is connected through the normally open contact switch 10 to one end of a relay coil 24 the other end of which is connected to the emitter of a p n p transistor 25 the collector of which is connected to ground. The relay coil 24 is bridged by a diode 24a to protect the circuit against back e.m.f induced in the coil 24 when either the switch 10 is opened or the transistor 25 is turned off. The cathode of the diode 23 is also connected through the normally open contact switch 12 to the base of the transistor 25, which base is also connected through a resistor 26 to the collector of the transistor 25.

The relay coil 24 has associated contacts in the form of a pair of three pole switches 27 and 28, the movable contacts 29 and 30 respectively of which are ganged. The positive side of the ignition system of the road vehicle is also connected to a supply line 31 which is connected through a normally closed contact of the switch 27 and through a series connected lamp 14, which is associated with the normally open contact switch 10, to ground. However, energisation of the relay coil 24 will cause the normally closed contacts to open and will cause the supply line 31 to be connected to said one end of the coil 24. The supply line 31 is also connected through a flasher unit 32 and through a normally open pair of contacts to the left hand direction indicator lamps 32a of the road vehicle. However, energisation of the coil 24 will cause the normally open contacts of the switch 28 to close to thereby energise the left hand direction indicator lamps 32a of the road vehicle through the flasher unit 32.

A bistable circuit is also provided and comprises two n p n transistor 33 and 34, the emitters of which are both connected to ground, and the collectors of which are connected through resistors 35 and 36 respectively to a supply conductor 37 which is connected through an electrolytic capacitor 38 to ground. The base of the transistor 34 is connected through a resistor 38 to ground and through a resistor 39 to the collector of the transistor 33. the base of the transistor 33 is connected through a resister 40 to the collector of the transistor 34. The base of the transistor 33 is also connected through a capacitor 41 in series with the normally open reed switch 20, to ground. The aforesaid one end of the coil 24 is connected through the normally open reed switch 19 to the supply conductor 37, and the collector of the transistor 34 is connected to the anode of a diode 42, the cathode of which is connected to the base of the transistor 25.

The positive side of the ignition of the road vehicle is also connected to the anode of a diode 43 the cathode of which is connected through the normally open contact switch 11 to one end of a further relay coil 44 the other end of which is connected to the emitter of a p n p transistor 45, the collector of which is connected to ground. However, the cathode of the diode 43 is also connected through the normally open contact switch 13 to the base of the transistor 45, which base is also connected through a resistor 46 to ground.

There is two further three pole switches 47 and 48 the movable contacts 49 and 50 of which are ganged together. The supply rail 31 is connected through the normally closed pair of contacts of the switch 48 and through a lamp 15, which is associated with the contact switch 11, to ground. However, energisation of the relay coil 44 will cause movement of the movable contact 50 to interrupt the circuit between the supply rail 31 and the lamp 15 and at the same time to connect the supply rail 31 to said one end of the coil 44. Moreover, the supply rail 31 is connected through the flasher unit 32, and through the pair of normally open contacts of the switch 47 to the right hand direction indicator lamps mounted on the road vehicle. However, energisation of the coil 44 will cause the movable contact 49 to close the normally open contacts of the switch 47 to thereby energise the right hand direction indicator lamps of the road vehicle through the flasher unit 32.

A further bistable circuit comprises a pair of n p n transistors 51 and 52, the emitters of which are connected to ground, and the collectors of which are connected respectively through resistors 53 and 54 to a supply rail 55. The supply rail 55 is connected through an electrolytic capacitor 56 to ground and is connected through the normally open reed switch 22 to said one end of the relay coil 44. The base of the transistor 51 is connected on the one hand through a resistor 57 to ground and on the other hand through a resistor 58 to the collector of the transistor 52. The base of the transistor 52 is connected through a resistor 59 to the collector of the transistor 51, which collector is also connected to the anode of a diode 60 the cathode of which is connected to the base of the transistor 45. Finally, the base of the transistor 52 is connected through a capacitor 61 and connected in series with the normally open reed switch 21, to ground.

The lamps 16 and 17 are connected respectively through the normally open pair of contacts of the switches 28 and 47 respectively and through the flasher unit 32 to the supply rail 31.

Moreover, said one end of the coil 24 is connected to the anode of a diode 62 the cathode of which is connected to the base of the transistor 45, and said one end of the coil 44 is connected to the anode of a diode 63 the cathode of which is connected to the base of the transistor 25.

In operation, and assuming that the driver of the road vehicle wishes to turn left at a road junction, he will depress the contact switch 10 which will cause energisation of the coil 24 since the transistor 25 is biassed on by the resistor 26 assuming that the potential at the collector of the transistor 34 is zero or substantially zero. Energisation of the relay coil 24 will cause the movable contact 29 of the switch 27 to connect the supply rail 31 to said one end of the coil 24 thereby maintaining energisation of the latter upon release of the contact switch 10. Energisation of the coil 24 will also the cause the movable contact 30 of the switch 28 to connect the supply rail 31 through the flasher unit 32 to the left hand direction indicator lamps of the road vehicle. Moreover, the lamp 14 which is normally energised to indicate the position of a movable button associated with the contact switch 10, will be deenergised and the lamp 16 will be energised intermittently through the flasher to indicate the position of a movable button associated with the contact switch 12.

Now, as the driver of the road vehicle negotiates the left hand turn the steering column of the road vehicle will be turned anti-clockwise and the permanent magnet 18 will first of all pass the reed switch 20 thereby temporarily closing the latter. However, this will have no effect since the supply rail 37 will be at zero or substantially zero potential. However, the permanent magnet 18 will then pass the reed switch 19 thereby closing the latter and connecting the supply rail 31 to the supply rail 37. The capacitor 38a will charge. Now, after the driver has negotiated a left hand turn and the steering column is returned in a clockwise direction towards its central position the reed switch 19 will once again be closed and this will be followed by closure of the reed switch 20. Now, when the supply rail 31 is connected to the supply rail 37 the bistable circuit will adopt the state in which the transistor 34 is on and the transistor 33 is off thereby maintaining the potential of the collector of the transistor 34 substantially at zero. However, once the reed switch 20 closes the capacitor 41 will charge thereby turning on the transistor 33 and in turn turning off the transistor 34. The collector of the transistor 34 will therefore go positive and this will result in transistor 25 turning off to de-energise the relay coil 24. The capacitor 38 maintains a sufficient voltage on the supply rail 37 to ensure correct operation of the circuit, but once this capacitor 38 has discharged neither transistor 33 or the transistor 34 will conduct until the reed switch 19 is once again closed.

If, however, the driver depresses the switch 10 to indicate he is pulling out of lane or the like and the steering column does not undergo a sufficiently large angular movement to cause the permanent magnet 18 to close the reed switch 19, then the left hand direction indicator lamps will not automatically cancel. Therefore, the driver of the road vehicle will need to depress the button associated with the normally open contact switch 12 which will in turn turn off the transistor 25 and de-energise the relay coil 24.

The normally open contact switches 11 and 13 are used in a similar manner in conjunction with their associated relay coil 44 and the additional bistable circuit together with the reed switches 21 and 22 to effect operation of the right hand direction indicator lamps.

The diodes 23 and 43 protect the circuit against reverse ignition transients and the diodes 62 and 63 constitute means for de-energising an energised relay coil if the manually operable switch associated with the other relay coil is operated. Thus, if the relay coil 24 is energised subsequent to depression of the normally open contact switch 10 and the driver of the road vehicle then depresses the normally open contact switch 11 to cause energisation of the coil 44 and thereby cause intermittent illumination of the right hand direction indicator lamps of the road vehicle, the supply to the diode 43 and the switch 11 will be connected through the diode 63 to the base of the transistor 25 to thereby turn this off and de-energise the relay coil 24.

It is to be understood that the transducer may take other forms such as for instance it may comprise a lamp source and four associated photo-cells.

I claim:

1. A direction indicator control circuit for use in a road vehicle having a steering mechanism, comprising first and second indicator means, first and second relays electrically associated with said first and second indicator means, respectively, for controlling the energization of said first and second indicator means, manually operable switch means associated with each relay for causing energization of the coil of the associated relay, first semi-conductor switch means connected to said first relay for controlling the energization of said first relay, means connected to said first semi-conductor switching means and responsive to movement of the vehicle steering mechanism in one angular direction towards its central position for controlling the conductive condition of said first semi-conductor switching means, second semi-conductor switching means connected to said second relay for controlling the energization of said second relay, and means connected to said second semi-conductor switching means and responsive to movement of the vehicle steering mechanism in the opposite angular direction towards said central position for controlling the conductive condition of said second semi-conductor switching means.

2. A circuit as claimed in claim 1 in which a transducer is provided, said transducer comprising a first part mountable on a moving part of the steering mechanism, and second and third parts which are associated with the first and second semiconductor switching means respectively and which co-operate with said first part to in use cause the associated semi-conductor switching means to control the energization of the associated relay coil.

3. A circuit as claimed in claim 1 in which electrical circuit means are provided for de-energising an energised relay coil if the manually operable switch means associated with the other relay coil is operated.

4. A circuit as claimed in claim 1 including first and second additional manually operable switch means are provided for permitting manual de-energisation of the first and second relay coils.

5. A circuit as claimed in claim 1 further including bistable circuit means connected between each of said first and second semi-conductor switching means and said vehicle steering mechanism responsive means for storing conditions of said vehicle steering mechanism and controlling said switching means in response thereto.

* * * * *